(12) United States Patent
Wright, Jr. et al.

(10) Patent No.: US 6,308,411 B1
(45) Date of Patent: *Oct. 30, 2001

(54) TRUCK CAB SIDEWALL AND METHOD FOR MAKING THE SAME

(75) Inventors: Homer Franklin Wright, Jr., Vancouver, WA (US); Edmond Kalstiantz, Beaverton; James Edward Hill, West Linn, both of OR (US)

(73) Assignee: Freightliner LLC, Portland, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,313

(22) Filed: Oct. 24, 1996

(51) Int. Cl.$^7$ ................................................. B21D 53/88
(52) U.S. Cl. .............................. 29/897.2; 29/448; 29/458; 29/462
(58) Field of Search .................................. 29/897.2, 458, 29/462, 464, 469, 469.5, 521, 525.02, 446, 448, 449; 156/307.7, 307.3; 296/183, 190.02, 190.08, 191, 190.01, 185, 178, 180.1, 180.2

(56) References Cited

U.S. PATENT DOCUMENTS

| | | |
|---|---|---|
| 1,693,750 | 12/1928 | Groehn . |
| 1,855,747 | 4/1932 | Ledwinka . |
| 2,058,622 * | 10/1936 | Place ................... 29/897.02 |
| 2,489,670 | 11/1949 | Powell, Jr. . |
| 2,600,140 | 6/1952 | Torseth . |
| 3,131,649 | 5/1964 | Eggert, Jr. . |
| 3,827,137 | 8/1974 | Schubach . |
| 4,293,363 * | 10/1981 | Wakabayashi et al. .......... 29/458 |
| 4,311,744 | 1/1982 | Watanabe . |
| 4,775,179 | 10/1988 | Riggs . |
| 4,973,103 | 11/1990 | Imajyo et al. . |
| 4,978,163 | 12/1990 | Savio . |
| 5,028,088 | 7/1991 | Del Monico et al. . |
| 5,066,067 | 11/1991 | Ferdows . |
| 5,203,601 | 4/1993 | Guillot . |
| 5,333,554 | 8/1994 | Yamada et al. . |
| 5,352,011 | 10/1994 | Kihara et al. . |
| 5,413,188 | 5/1995 | Ui . |
| 5,474,352 | 12/1995 | Davies . |
| 5,560,673 | 10/1996 | Angelo . |
| 5,619,784 * | 4/1997 | Nishimoto et al. ............. 29/469 X |
| 5,642,563 * | 7/1997 | Bonnett ........................ 29/464 |
| 5,769,486 | 6/1998 | Novoa et al. . |
| 5,863,093 | 1/1999 | Novoa et al. . |
| 6,012,765 | 1/2000 | Novoa et al. . |
| 6,120,089 | 9/2000 | Kalstiantz et al. . |

FOREIGN PATENT DOCUMENTS

| | | |
|---|---|---|
| 254689A | 1/1988 | (EP) . |
| 0 736 445 A1 | 10/1996 | (EP) . |
| 1501390 | 2/1978 | (GB) . |
| 1575001 | 9/1980 | (GB) . |

* cited by examiner

Primary Examiner—P. W. Echols
Assistant Examiner—T. Nguyen
(74) Attorney, Agent, or Firm—Klarquist Sparkman LLP

(57) ABSTRACT

A sidewall skin is provided having a front edge, rear edge, top edge, and bottom edge, and a first exterior side and a second interior side. An inwardly directed front flange is provided along the front edge, and an inwardly directed flange is also provided along the top edge. The sidewall skin has a inwardly stepped transition region spaced rearwardly of the front edge. A rear corner is formed in the skin at a location forwardly of the rear edge and rearwardly of the transition region. A portion of the skin between the rear edge and rear corner forms part of the back wall of the truck cab. The sidewall skin is preferably adhesively secured to a sidewall framework with fasteners being virtually eliminated during the sidewall assembly process. The adhesive may be heat cured, which may involve a first partial heat curing step to provide the sidewall with handling strength followed by a second heat curing step. The second step is typically accomplished during curing of paint after a truck cab is assembled.

18 Claims, 11 Drawing Sheets

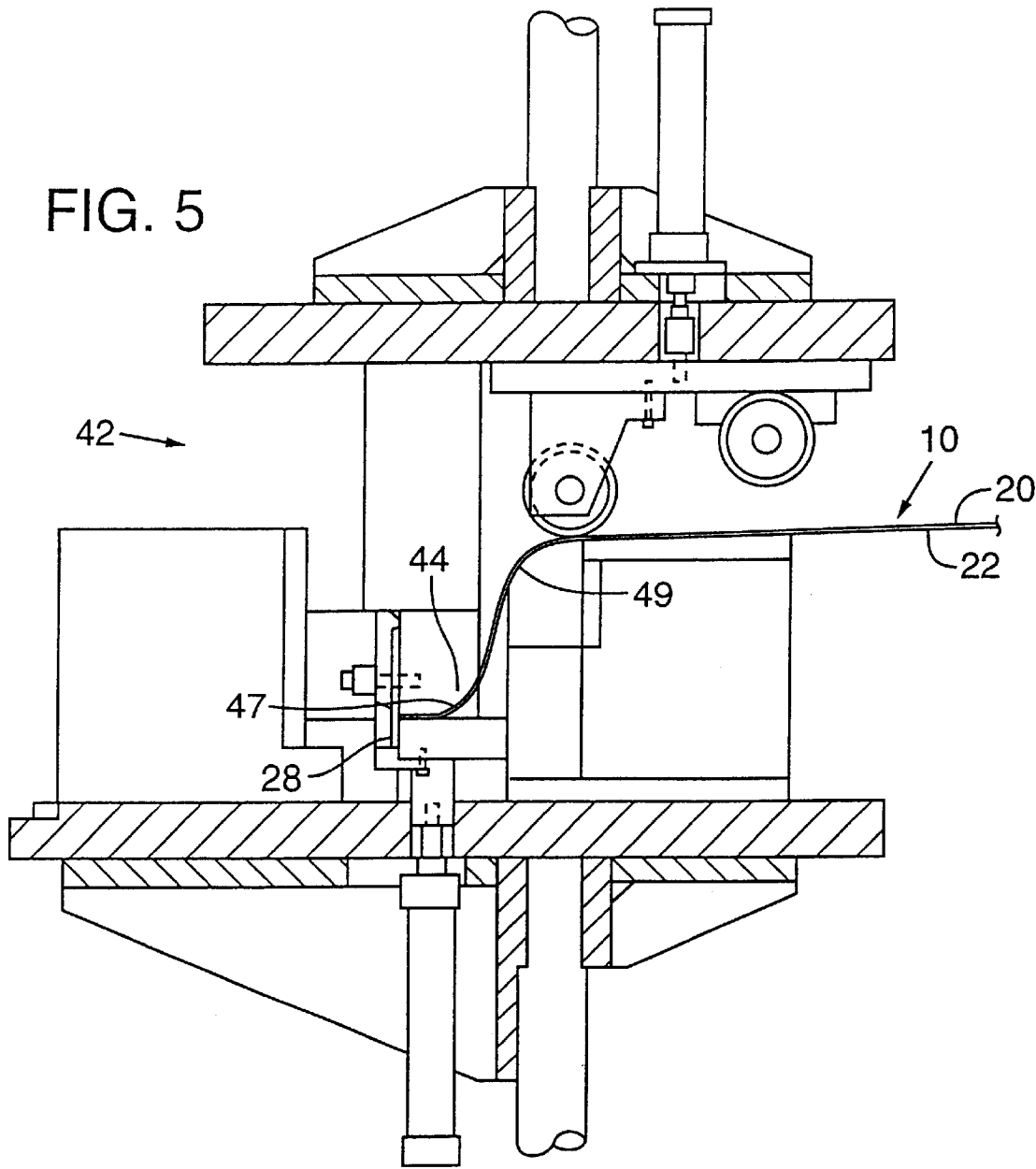

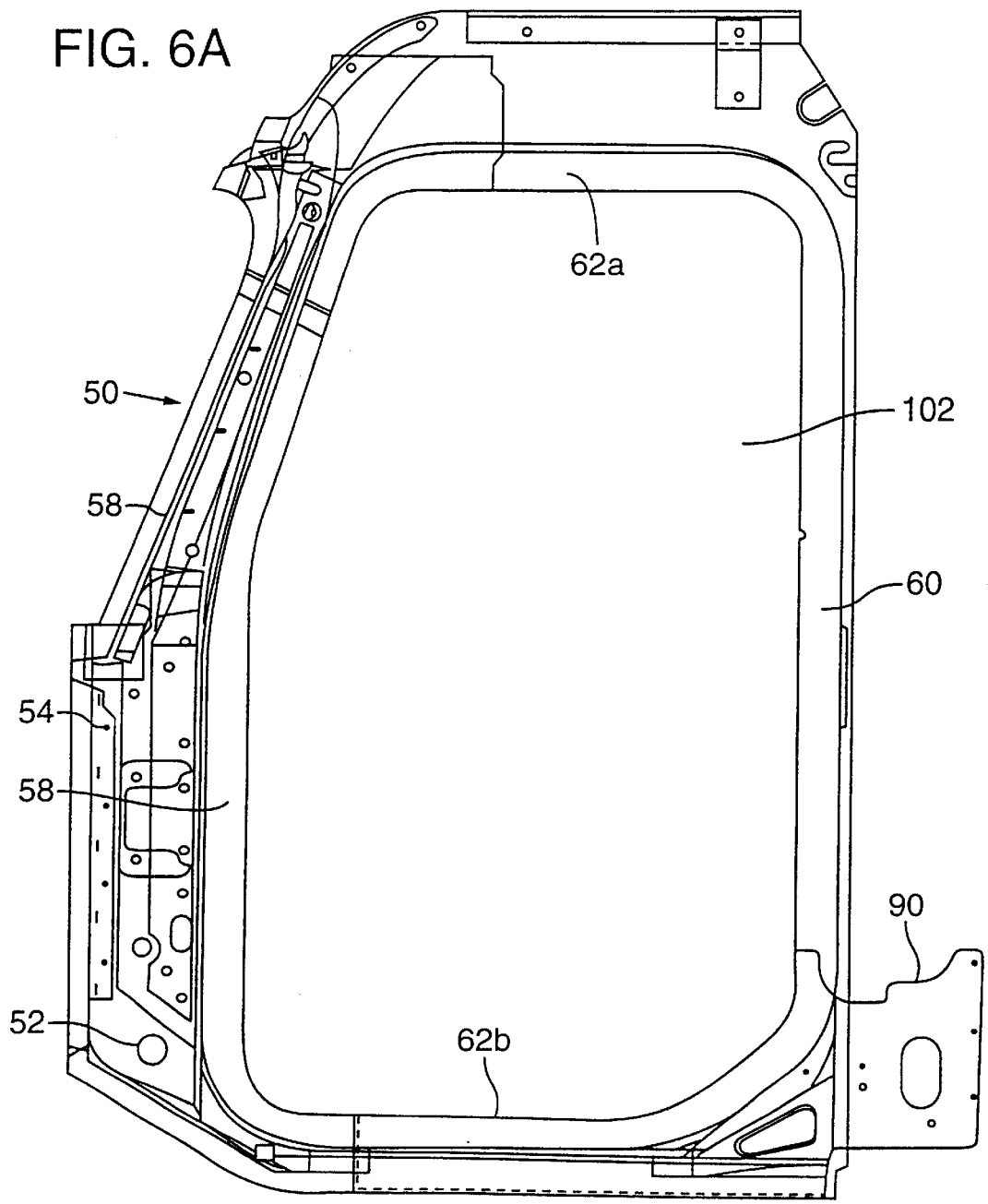

TRUCK CAB SIDEWALL AND METHOD FOR MAKING THE SAME

FIELD OF THE INVENTION

The present invention relates to vehicle sidewalls, and more particularly, a truck cab sidewall and a process for making the same.

BACKGROUND OF THE INVENTION

The process of assembling a vehicle involves numerous components and assembly sequences. For instance, many truck cab sidewalls are comprised of a number of pieces of sheet metal attached together. Obviously, this requires separate manufacture processes of each piece, which undoubtedly increases the overall time and complexity of manufacturing the truck cab. In addition, a truck cab sidewall skin is typically riveted to an underlying structure in order to retain it in place. Obviously, a great number of rivets must be used and individually installed in order to secure the sidewall. Furthermore, there are many problems normally associated with riveting sidewalls or sheet metal to a truck cab structure. In particular, leaks may develop through the rivet holes thereby allowing water to penetrate the interior of the truck cab and damage interior components or the sidewall itself.

Therefore, a need exists for a process and truck cab sidewall directed toward overcoming the above-described and other problems typically associated with assembling a truck cab.

SUMMARY OF THE INVENTION

Accordingly, it is an object of the present invention to provide a vehicle sidewall manufacturing process and truck cab sidewall which is easier and less costly to assemble into a truck sidewall.

The sidewall has a skin with top, bottom, front, and rear edges. The skin has a first exterior surface and a second interior surface opposing the first exterior surface. The sidewall skin preferably has a front flange formed along the front edge. The front flange preferably projects in a first or inward direction (in a direction toward the interior of the cab). The front flange is sized and positioned for attachment to a door frame of the sidewall so that the sidewall skin may readily and securely be fastened to the underlying truck cab structure. The sidewall skin also preferably has a flange along the top edge which also most preferably is inwardly directed. The top flange may be utilized in attaching the sidewall skin to the underlying sidewall structure of the truck cab. A rear corner is preferably included in the sidewall skin and is formed in the sheet metal at a location spaced inwardly from the rear edge of the sheet. The portion of the sidewall between the rear edge and the corner comprises a portion of the exterior surface of a rear wall of the truck cab. The rear corner is preferably formed by a roll forming technique, as discussed herein in more detail.

The sidewall assembly preferably has a plurality of upright or vertical frame elements or pillars. The upright frame elements of the sidewall assembly have a first exterior surface and a second interior surface opposite the first exterior surface. An upper reinforcing element is preferably provided and interconnects the upper ends of the upright frame elements. The upper reinforcing element also has a first exterior and a second interior surface opposite the first exterior surface. A door frame is fastened to the sidewall frame assembly to substantially complete the underlying framework for the sidewall of the truck cab.

Adhesive is applied to the exterior surfaces of the upright frame elements and the upper reinforcing element. The sidewall skin is typically coupled to the door frame and is adhesively secured to the sidewall frame elements by applying tension to the sidewall skin in a direction from the front of the skin to the rear of the skin. The top or upper flange portion of the sidewall skin can be mechanically fastened to the upper reinforcing element, preferably in the area near the transition region. Although the adhesive may be ambiently cured, preferably an active curing is accomplished. In keeping with this approach, the sidewall assembly is preferably heated to cure the adhesive. The heat curing may be accomplished in a plurality of steps. For example, to provide handling or "green" strength, the sidewall may be heated to partially cure the adhesive. A second or final heat curing step can be performed, for example, after the sidewall is mounted to the truck cab assembly. Preferably, final curing of the adhesive is accomplished simultaneously with a paint curing step during which paint applied to the cab is also cured.

The present invention is directed toward the above objects and advantages individually as well as collectively. These and other objects, advantages, and features will become apparent with reference to the following description and Figures.

BRIEF DESCRIPTION OF THE DRAWINGS

FIG. 5 is a die-press machine which may be used to form the transition region of the sidewall skin of FIG. 1 in a single pressing step.

FIG. 6A is a side view of one embodiment of a door frame which may be used in combination with the sidewall skin of the present invention in a truck sidewall assembly of the present invention.

DETAILED DESCRIPTION OF THE PREFERRED EMBODIMENTS

Sidewall Skin Formation

Figure 1:
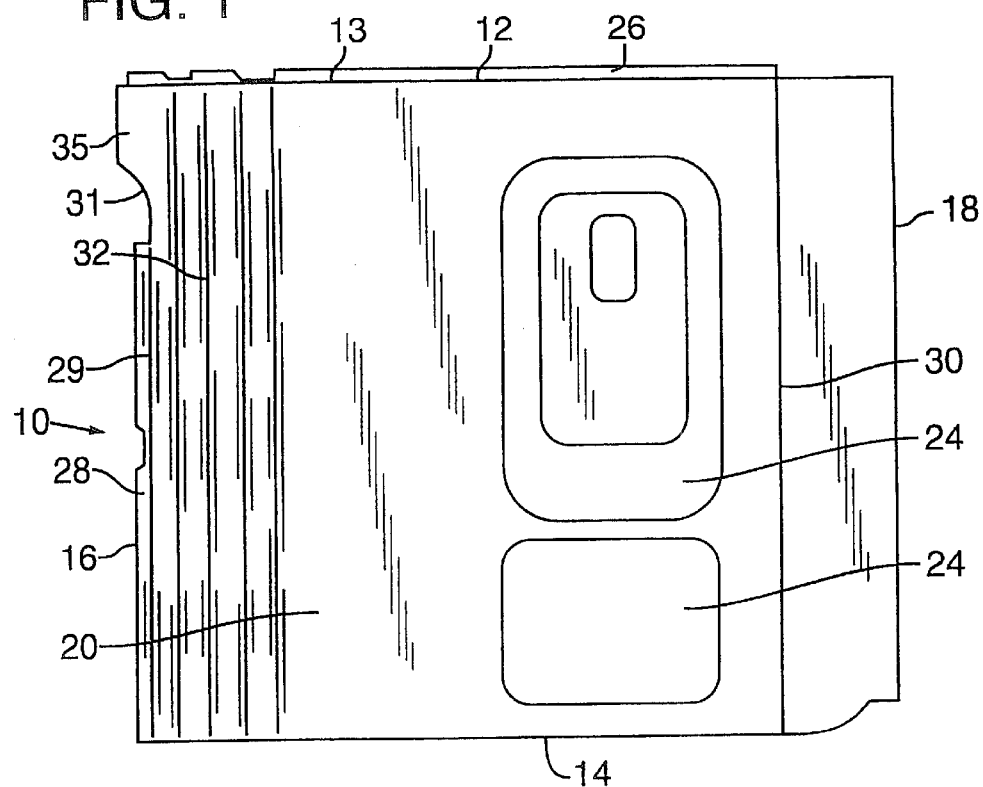
FIG. 1 is a side view of a blank used in the manufacture of one embodiment of a sidewall skin for a sidewall of the present invention.

FIGS. 1 through 5 show a sidewall skin 10 useful in one form of the present invention and a method for making this form of sidewall skin. Referring to FIG. 1, a blank for forming the sidewall skin 10 is shown. The sheet is preferably of metal and has a top edge 12, bottom edge 14, and front and rear edges 16, 18. The sheet also has a first exterior side surface 20 and a second interior side surface 22 (FIG. 4) opposite the first exterior side surface. Optional openings 24 may be formed or cut out of the blank to provide access through the sidewall and into storage spaces or compartments to be located within the truck cab. In other words, openings can be selectively cut in the sheet material blank between the major opposed surfaces to provide access to the cab's storage compartments or for other purposes.

Figure 2:
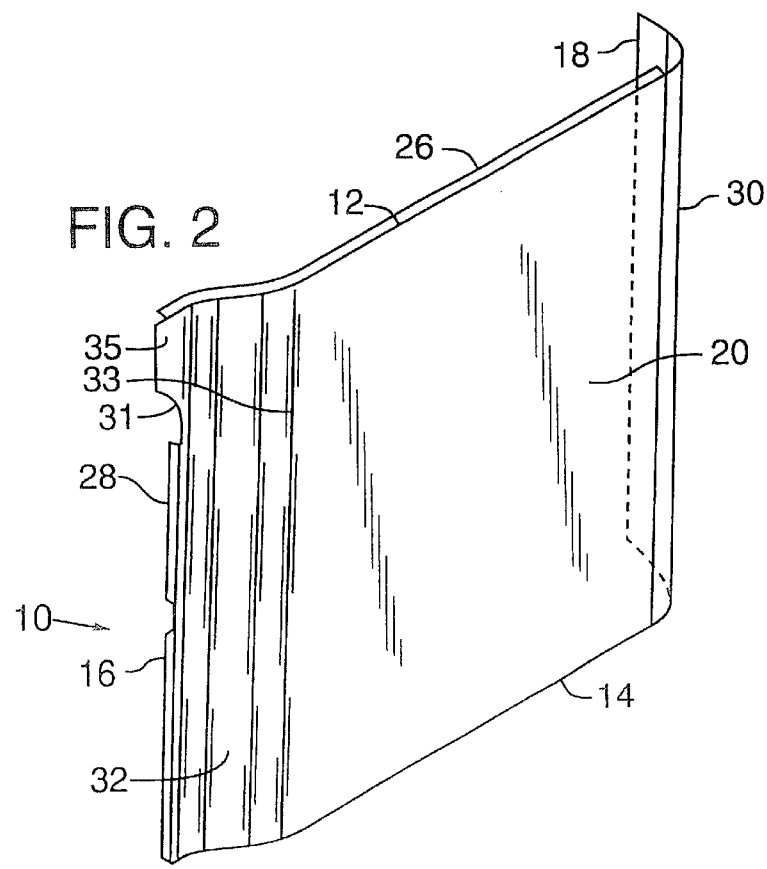
FIG. 2 is a perspective view of one embodiment of the sidewall sin of FIG. 1.

As shown in FIGS. 1 and 2, in particular, an inwardly directed flange 26 is formed along a fold line 13 at the top edge 12 of the sidewall skin 10. The fold line 13 as well as line 29 and other fold lines on the blank are imaginary and are simply shown for purposes of illustrating locations where the sidewall is bent. As will be discussed in more detail below, and as shown in the figures, the top flange 26 may be provided in one form of the invention and utilized, for example, in attaching the sidewall skin to an underlying frame structure of the truck cab. As also shown in FIGS. 1 and 2, a front flange 28 may be formed along a fold line 29 adjacent to the front edge 16 of the sheet metal. The front flange 28 projects in a first or inward direction, in this case in a direction towards the interior of the cab when the sidewall skin is incorporated into the cab. The front flange 28 is preferably upright or vertically oriented. The flange 28 is sized and positioned for attachment to a door frame so that the front edge of the sidewall skin can be rigidly and securely fastened to the underlying framework of the truck cab. The blank has an upwardly and forwardly extending arcuate edge 31 above the line 29. As a result, a skin flap 35 is available for mounting to the door frame above the door.

As shown in FIG. 2, a rear corner 30 may be formed at a location of the blank inwardly from the rear edge 18. The portion of the sidewall skin between the rear 18 edge and the rear corner 30 may comprise a portion of a rear wall of the assembled truck cab. Also, a portion of the sidewall skin between the front flange 28 and the rear corner 30 comprises a transition region 32 of the sidewall of the truck cab. More specifically, in the illustrated form, the transition region 32 commences at a location just rearwardly of the line 29, and terminates at a location 33, which is typically no more than about one-fifth of the overall width of the sidewall skin. The transition region is optional and is preferably included in trucks of a design which have a wider rear sleeper cab portion than the front portion of the cab.

Figure 3:
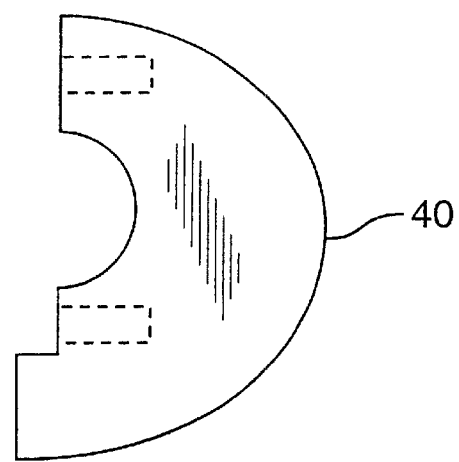
FIG. 3 is a side view of an arbor for a roll forming machine which may be used to form a rear corner in the sidewall skin of FIG. 1.
Figure 4:
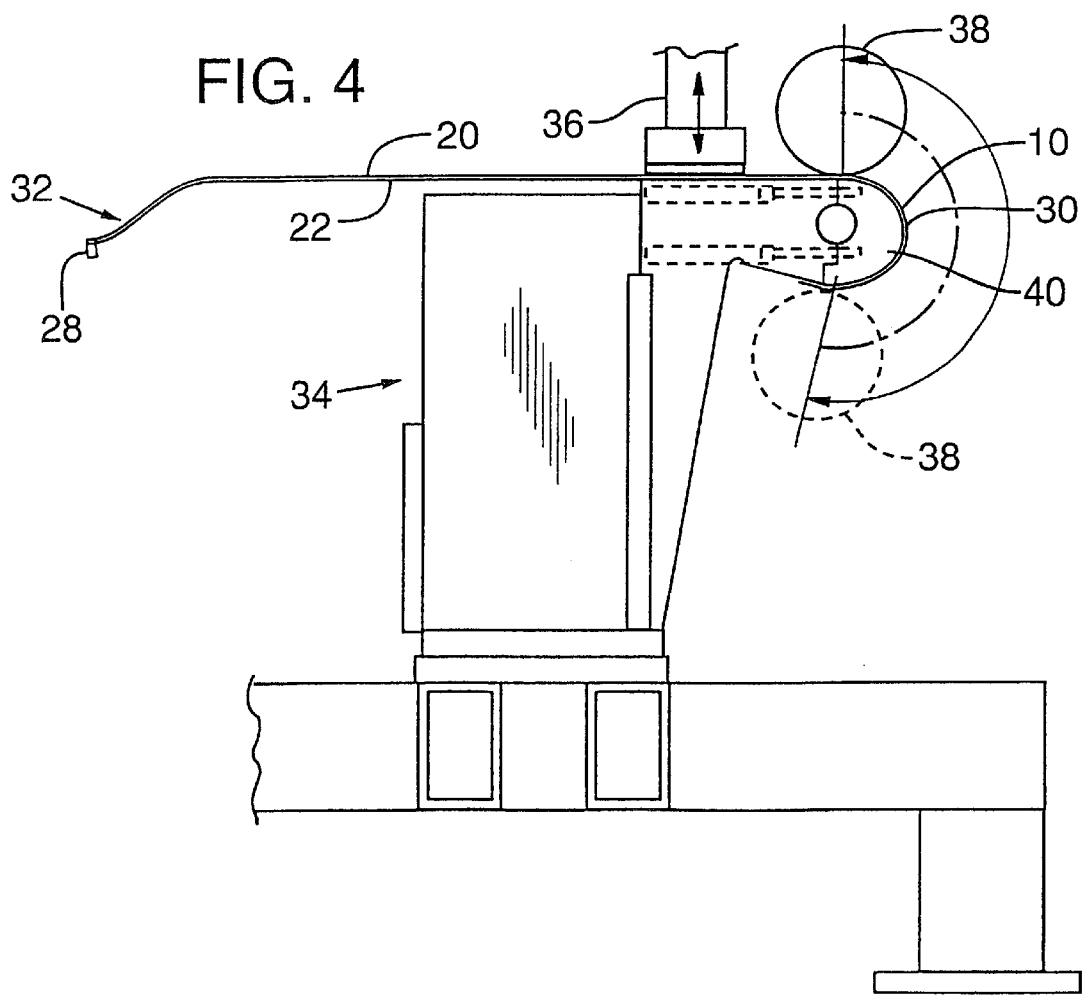
FIG. 4 is a side view of a roll forming machine used to form the sidewall skin of FIG. 1.

Although it may be formed in other ways, as shown in FIG. 4, the rear corner 30 is preferably formed by a roll forming technique. The sidewall 10 is placed substantially horizontally on a roll forming machine 34. A press 36 is used to retain the blank on the roll forming machine 34 in order to prevent it from moving while forming the rear corner 30. A roller form bar 38 is used to form the rear corner 30 in the blank. To form a 90 degree corner, the blank is bent to a greater extent than 90 degrees to accommodate springback. For example, for an aluminum blank of 50 mil aluminum, and as shown in FIG. 4, the roller form bar 38 rolls along an essentially 170 degree rotational path. Thus, not only does the roller form bar 38 rotate along its axis, it also follows a rotational path in order to form the rear corner 30 of the sheet metal 10. By following a 170 degree rotational path, a 90 degree corner 30 is essentially formed in the sidewall. In other words, although the sheet metal is bent more than 90 degrees as the roller bar 38 travels along a 170 degree path, the sheet metal springs back to form a 90 degree corner. FIG. 3 shows a side view of a form of arbor 40 used to form the rear corner of the sheet metal. More specifically, the roller bar 38 rolls along the path formed by the exterior surface of the arbor 40. As shown in FIG. 4, the sidewall is held between the roller bar 38 and arbor 40 during the process of forming the corner.

Again, as shown in FIG. 2, a transition region 32 is preferably formed in the sheet metal. The transition region 32 is spaced rearwardly of the front flange 28 and forwardly of the rear corner 30 of the sheet metal 10. The transition region is stepped inwardly (moving from back to front along the sidewall) with respect to a plane containing a major portion of the exterior surface 20 of the sheet material. In other words, the transition region 32 is stepped inwardly toward the interior of the truck cab. The transition region preferably extends vertically between the top 12 and bottom 14 edges of the sheet metal or skin.

Although other techniques may be employed, the transition region is preferably formed in a single step utilizing a die-press 42 (FIG. 5). Thus, both bends which make up the transition region are formed simultaneously in a common manufacturing step by the die-press 42. The die-press includes a die 44, 45 with curved surfaces 47, 49 which form the inwardly stepped transition region 32 when pressed against the sheet metal 10 as shown in FIG. 5. As shown in FIG. 2, the illustrated transition region is generally of an "S-shaped" cross-section. As shown in FIGS. 4 and 5, during formation of the transition region, the skin 10 is typically supported in a horizontal orientation during the forming steps, with the interior surface 22 positioned below the exterior surface 20, and the interior surface supported from below.

Preferably, when constructing the sidewall 10 the front flange 28 is first formed along the front edge 16 of the sheet. Consequently, the front flange 28 may be gripped by die-press 42 when the transition region 32 is formed. The transition region 32 is then formed using the die-press 42. The top flange 26 is then formed along the top edge 12 of the sheet and the rear corner 30 is then formed. However, if openings 24 are provided through the sheet, as discussed above, they are preferably cut before forming the flanges, transition region, and rear corner. Typically, multiple sheets are stacked and the openings are simultaneously cut in the sheets, such as by using an NC router.

During each of the skin formation steps, the blank may be supported on interior side 22. Consequently, possible marring and scratching of the exterior surface 20 is minimized.

It should be appreciated that the skin can be formed in alternative ways without departing from the present invention.

Truck Door Frame

Figure 6B:
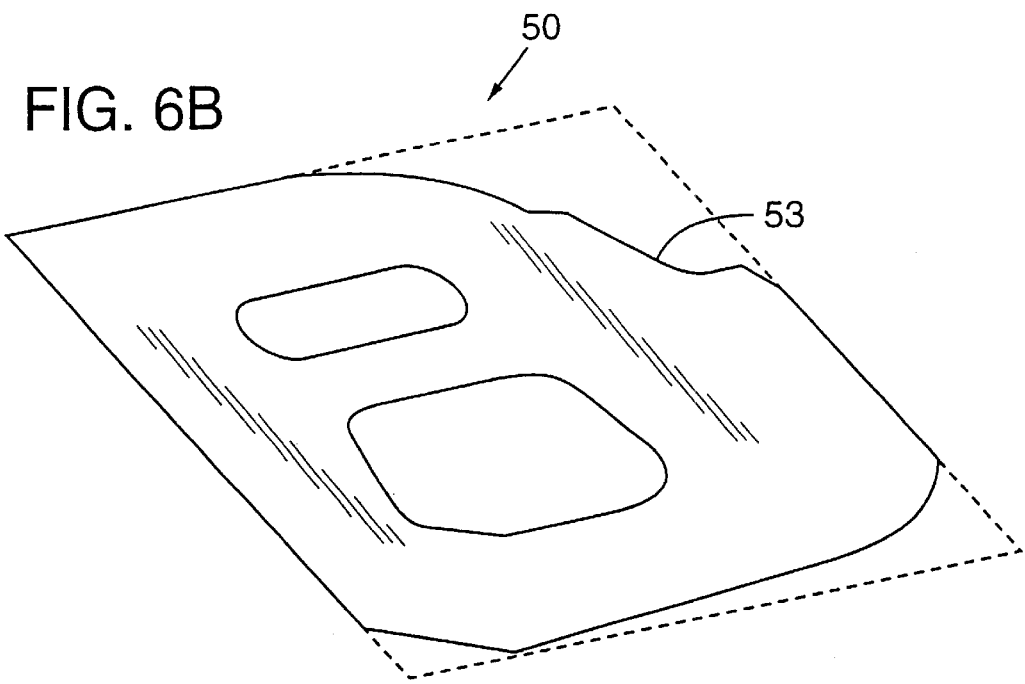
FIGS. 6B–6F illustrate one exemplary sequence of forming the door frame of FIG. 6A from a monolithic piece of sheet metal.
Figure 6C:
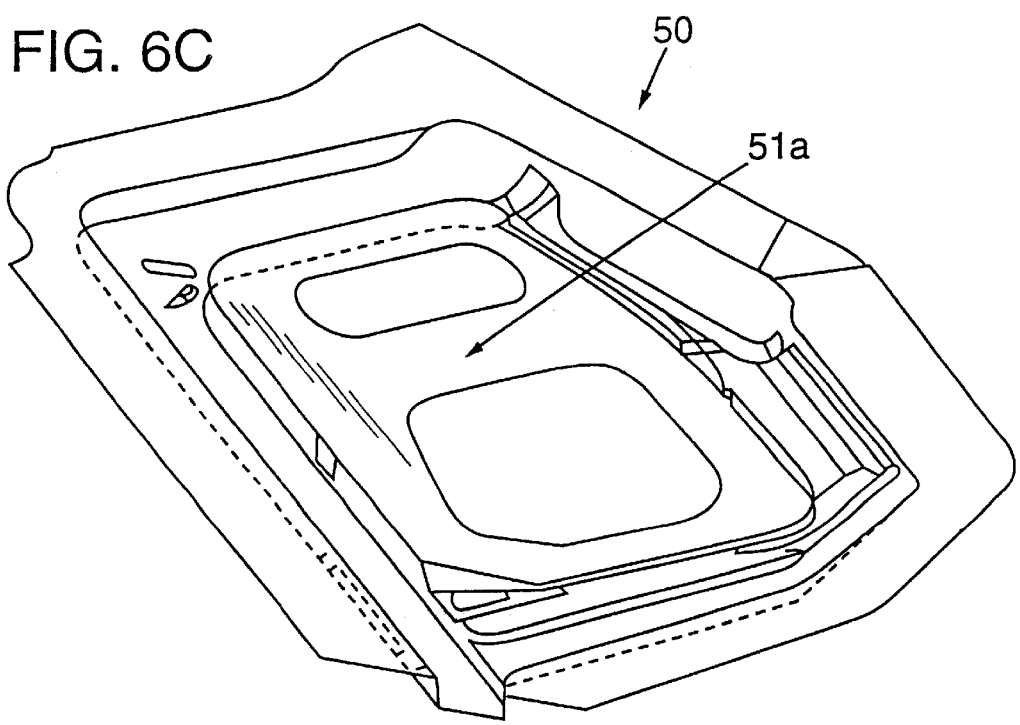
Figure 6D:
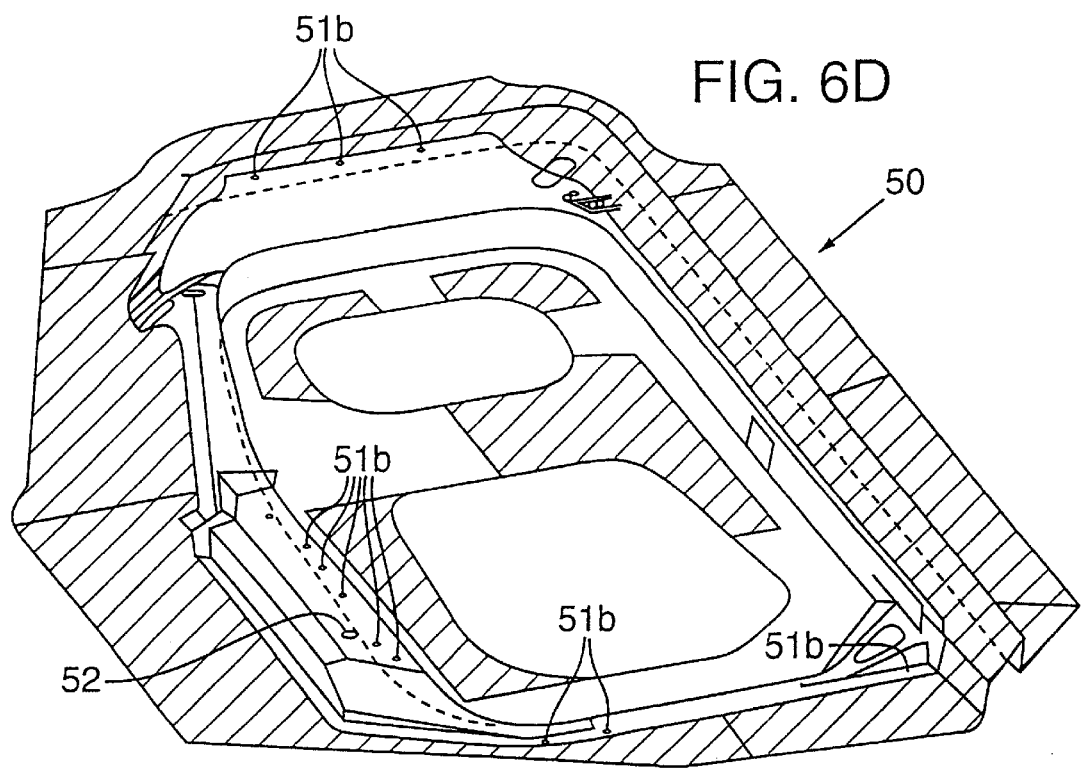

In further accordance with the present invention, the front flange 28 of the skin may be affixed to a rear upright element of a door frame. The door frame may take any convenient form, including prior art forms. However, one suitable door frame assembly 50 is shown in FIG. 6A. This particular door frame is structurally strong and rigid. FIGS. 6B–6F show an exemplary sequence for forming the door frame of FIG. 6A from a monolithic sheet or blank, such as of metal. The door frame may be formed using a doubleaction toggle press with die cushion in bed. The sheet metal blank is first pre-drawn and cut along boundary 53 to take the form shown in FIG. 6B. The sheet is then drawn or die-pressed and cut as shown in FIG. 6C. A nitro pad is place in the area indicated by arrow 51a. As illustrated in FIG. 6D, the blank is restruck and trimmed (with the cross-hatched areas removed) and then pierced with holes where indicated by arrows 51b. Hole 52 is a pilot or gauge hole which may be used as a reference when assembling the truck cab.

Figure 6E:
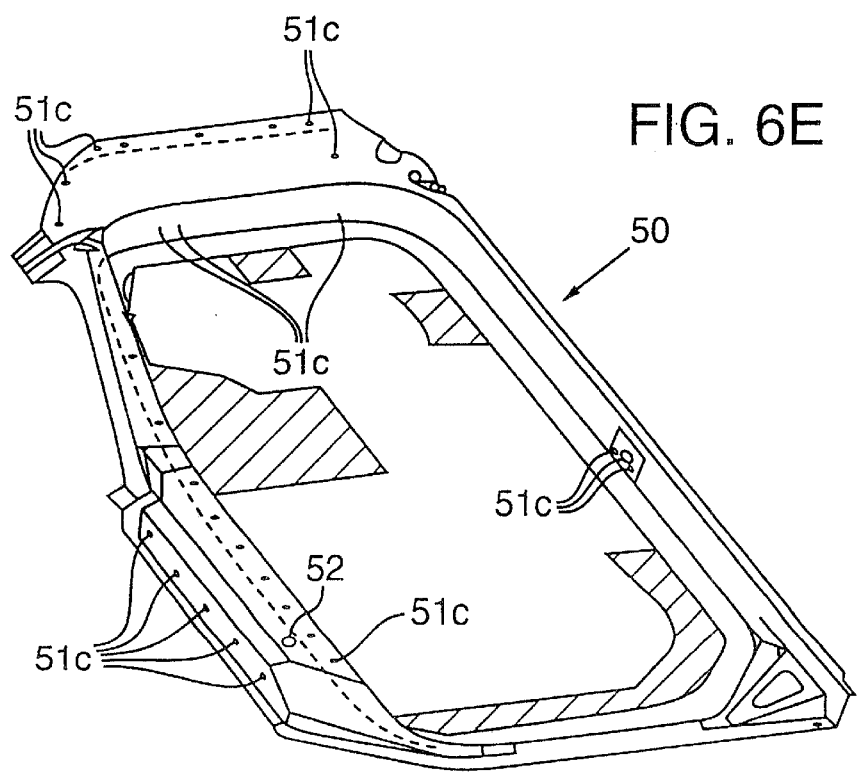
Figure 6F:
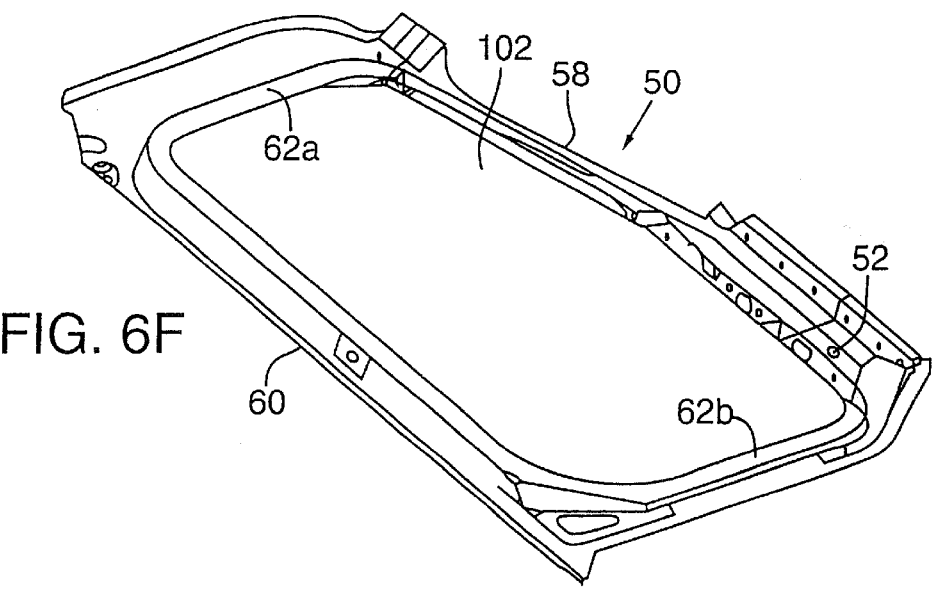

FIG. 6E illustrates, by arrows 51c, locations where holes are cam punched, and identifies further trim (see the cross-hatched areas) and restrike areas. Finally, FIG. 6F shows the illustrated door frame following these steps.

The door frame 50 is preferably stamped or formed from a single or monolithic piece of sheet metal. By doing so, numerous pieces typically used to comprise a truck cab door frame are eliminated. Further, the illustrated door frame is preferably constructed to enclose or bound the entire perimeter metal. By doing so, numerous pieces typically used to comprise a truck cab door frame are eliminated. Further, the illustrated door frame is preferably constructed to enclose or bound the entire perimeter of a door opening. As a result, the door frame is strong and is also relatively easy to install.

The blank used to make the door frame is preferably sheet metal with an aluminum 5052 alloy commercially available from Alcoa Aluminum Co. being a specifically preferred material. The sheet metal is preferably 50 mil thick. Again, the door frame 50 most preferably has a pilot or gauge hole 52 for use in positioning the frame and aligning components relative to the gauge hole during cab assembly. For example, a protruding alignment pin from a jig or positioner (not shown) can be inserted through the pilot hole 52 for retaining or holding the door frame, and for serving as a reference point to properly align the door frame and door (as well as sidewall) during the manufacturing process.

As shown in FIG. 6A, the door frame typically has a number of fastener receiving holes for attachment of other related truck cab components. For instance, the door frame may have a plurality of holes for attachment of a firewall-dashboard assembly to the truck cab assembly. The door frame may also have a plurality of holes 54 for receiving fasteners to attach a door to the frame by the use of a hinge.

The illustrated door frame 50 (see FIGS. 6A, 6F and 6G) has essentially two upright support elements, namely, a front upright support element 58 and a rear upright support element 60. The element 58 forms an outboard portion of an A-pillar or upright frame component forwardly of the door of the truck. A substantially horizontal frame support element 62a interconnects or extends between upper ends of the front upright support element 58 and the rear upright element 60. The upper surface 64 (FIG. 6G and FIG. 8) of the upper horizontal frame element contains a plurality of holes 66 for attachment of roof related structures to the truck cab. It should be understood, however, that the roof of the truck cab is not part of the present invention described herein, and that the truck cab roof can vary in design and structure and still be suitable for use with the present invention. A substantially horizontal support element 62b also interconnects or extends between the lower ends of the upright support elements 58, 60.

Figure 6G:
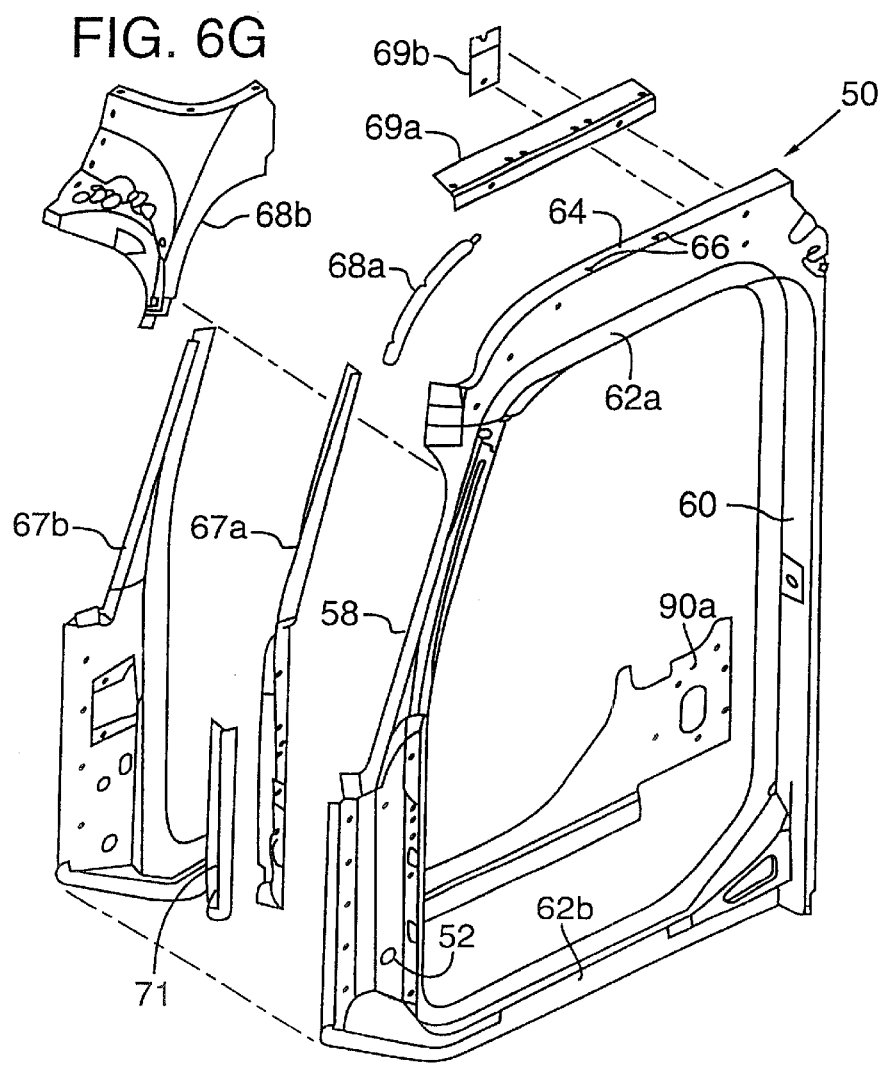
FIG. 6G is an exploded perspective view of a door frame assembly in which the door frame of FIG. 6A is shown together with additional components which may be attached thereto.

As shown in FIG. 6G, components may be added to the door frame 50 to form a door frame assembly. For example, an internal A-pillar reinforcement support 67a can be mounted to the front upright support element 58. An inboard A-pillar section 67b may also be mounted to the front upright support element 58. B-pillar bridging or reinforcing plates 90a, 90b (see FIG. 9) may also be mounted to the door frame. These reinforcing plates assist in rigidly connecting the door frame to rearward components of the truck sidewall. A sunvisor mounting bracket 68a and a sunvisor mounting back-up plate 69b may also be mounted to the upper horizontal interconnecting support element 62a of the door frame. A forward roof cross-piece section 68b may, in addition, be mounted to the door frame along with roof coupling element 69a. A door reinforcing bracket 71 may be mounted to the A-pillar forming components to back up a door hinge coupled to the door frame. The door frame assembly may, of course, be of a different construction and be comprised of different elements without affecting the present invention.

Sidewall Assembly

Figure 7:
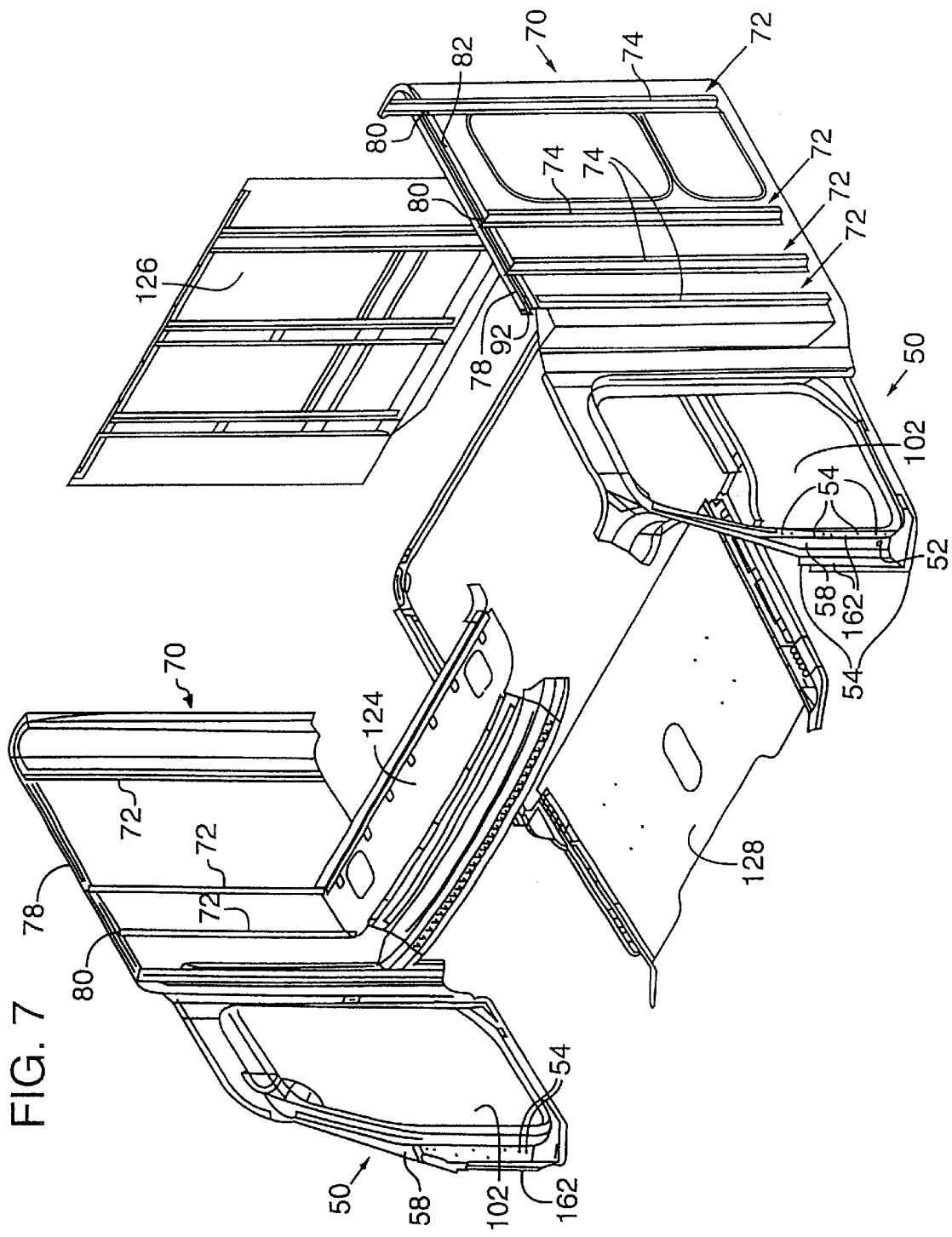
FIG. 7 is an exploded perspective view of a truck cab assembly with sidewalls of one form of the present invention (the sidewall skin at the driver's side of the truck being depicted as if it were transparent to show a sidewall frame underneath the skin).
Figure 8:
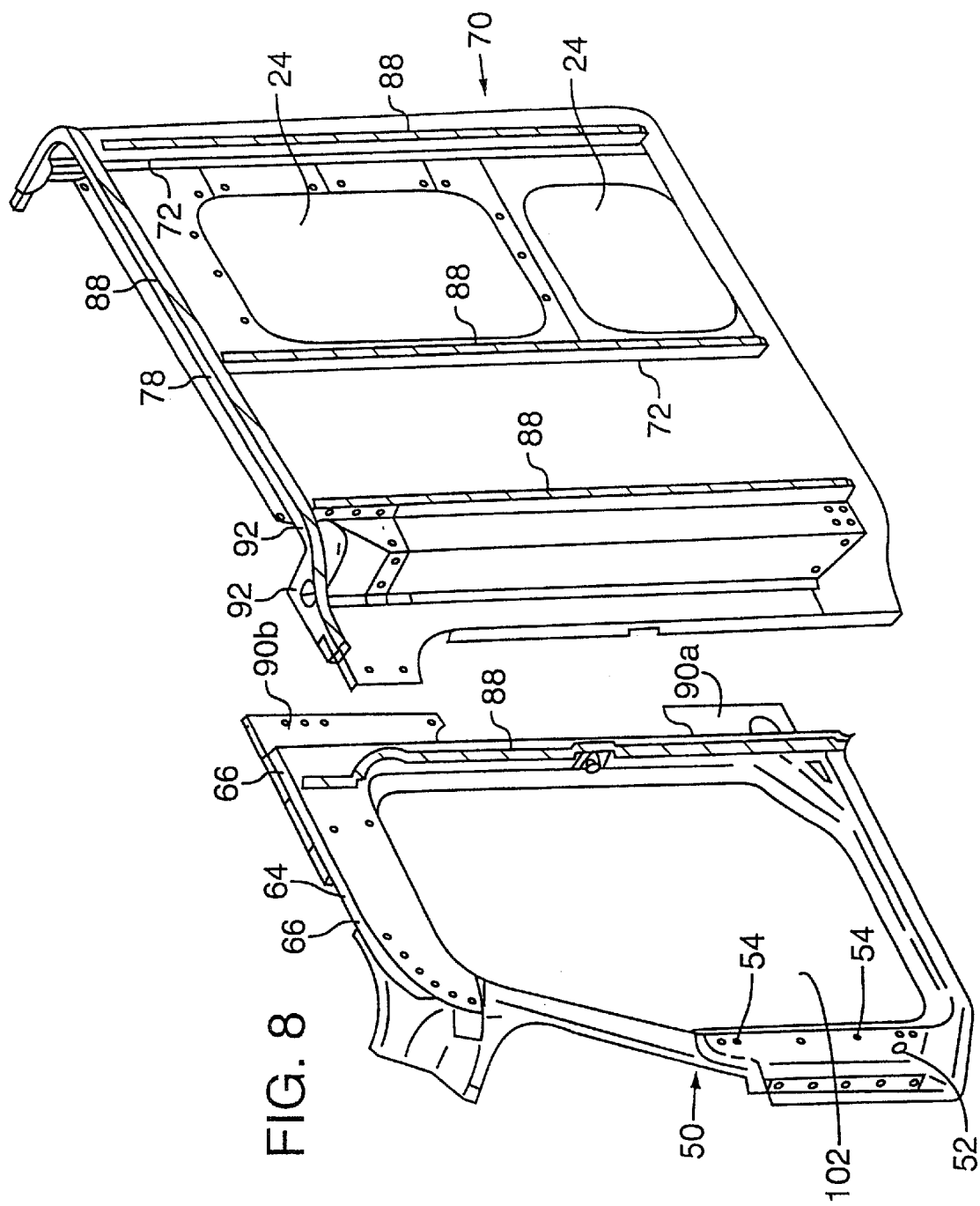
FIG. 8 is a side elevational view of an exemplary underlying frame structure (including the door frame) to which a sidewall skin (shown in the same manner as in FIG. 7) may be mounted, for example by adhesives, when used in a truck sidewall.
Figure 9:
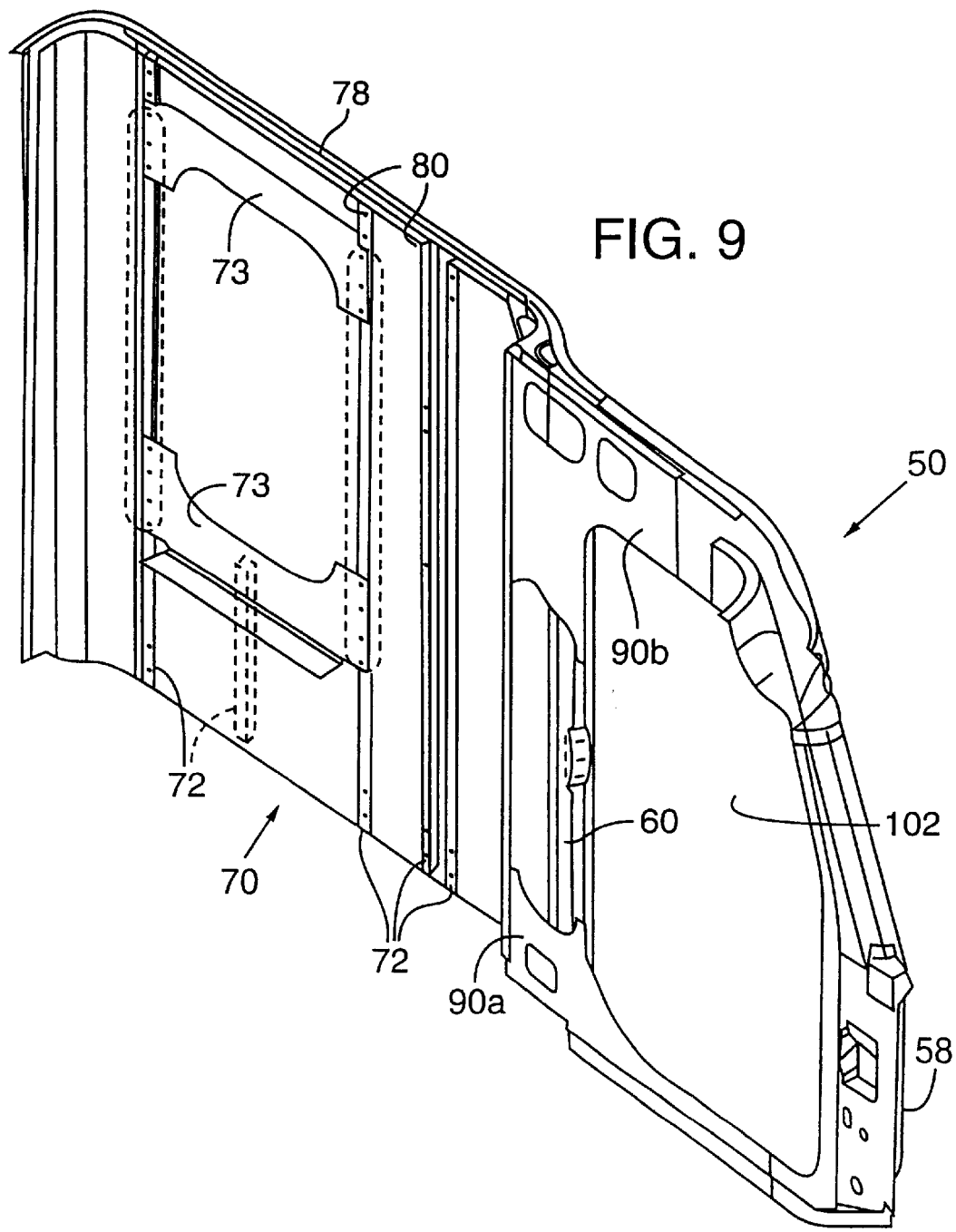
FIG. 9 is an interior perspective view of the interior side of the assembled truck sidewall of FIG. 8.
Figure 10:
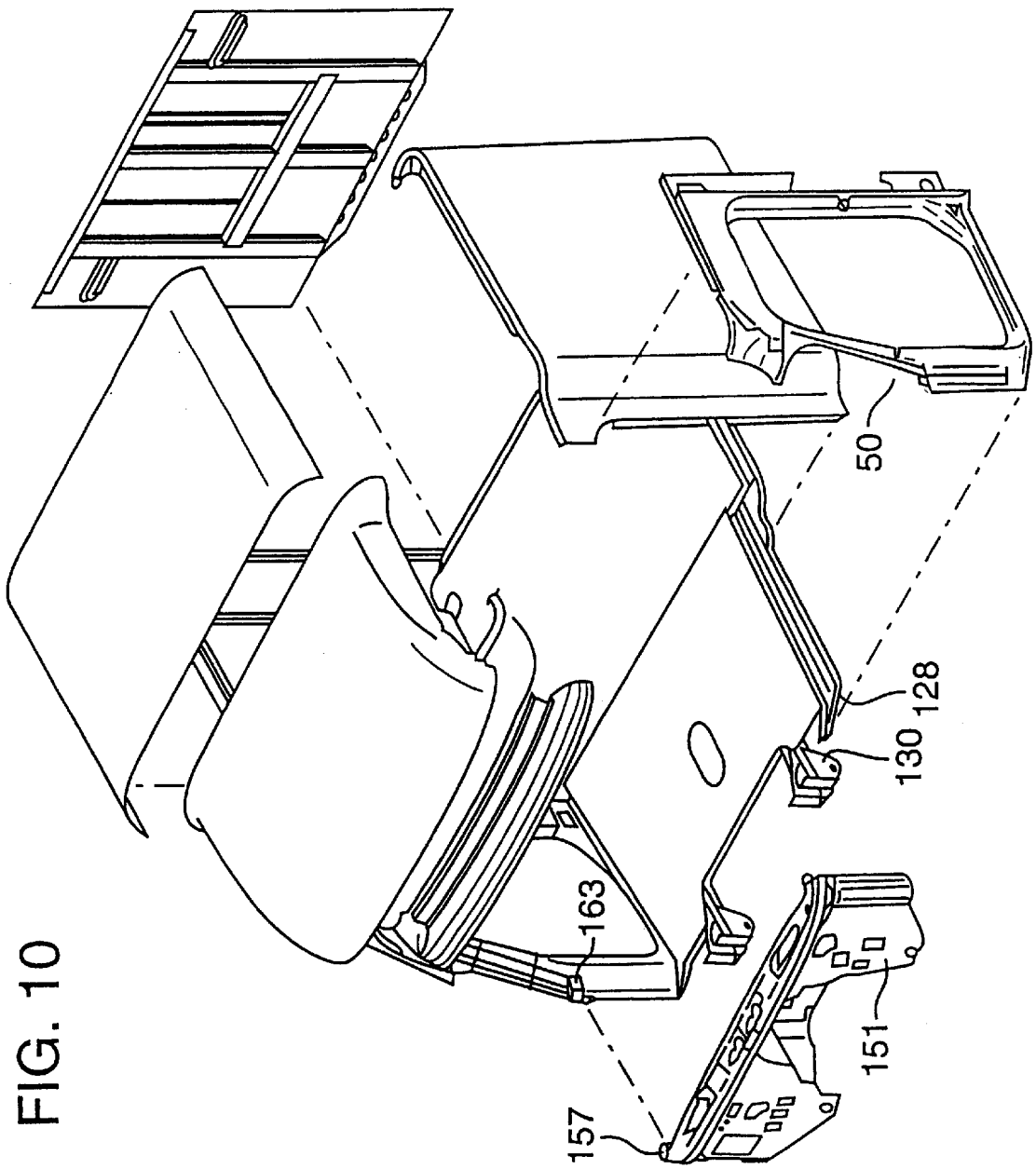
FIG. 10 is an exploded perspective view of a truck cab including sidewall skins of one form of the present invention.

The sidewall underlying frame assembly 70 is best shown in FIGS. 7–9. As illustrated, the sidewall frame assembly preferably has a number of upright or vertical frame elements or studs 72 and opening bridging cross-pieces 73. The frame elements 72 have a first exterior surface 74 and a second interior surface opposite the first exterior surface. These frame elements may be of any suitable material, with aluminum (80 mil thick) being specific exemplary material. The door frame 50 is fastened to the sidewall frame assembly 70 (see, for example, FIG. 9) to complete the underlying framework for the side of the truck cab. The illustrated sidewall frame assembly 70 has an upper elongated horizontally extending reinforcing element 78 (FIG. 7) interconnecting upper ends 80 of the upright frame elements 72. The upper reinforcing element 78 has a first exterior surface 82 (FIG. 7) and a second interior surface opposite the first exterior surface. The pilot hole or gauge hole 52 in the door frame enables the frame assembly 70 to be aligned during the manufacturing process by inserting alignment elements or pins through the gauge hole when the sidewall skin is mounted to the frame. The upright frame elements 72 preferably extend substantially from the floor 128 to the roof structure 124 of the cab body. That is, the upright frame elements extend substantially to the top edge 12 of the sidewall 10 where the edge of the roof structure (not shown) joins the sidewall. The underlying frame is also attached to the door frame 50. As previously mentioned, the door frame assembly may have reinforcing plates 90a, 90b connected thereto. The sidewall frame 70 is coupled to the reinforcing plates 90a, 90b (see FIGS. 8 and 9).

The sidewall 10 is attached to the exterior surfaces 74, 82 of the frame elements 72, 78, and also to the frame element 60. Although rivets or other fasteners may be used, most preferably, adhesives are used to minimize the need to penetrate the sidewall with fasteners. Thus, in a preferred approach, adhesive is applied to the exterior surfaces 74, 82 of these frame elements (as illustrated by heavy black lines 88 in FIG. 8). Before applying the adhesive, the exterior surfaces 74, 82 of the upright frame elements 72, 78 are preferably wiped clean and scuffed to provide better contact with the adhesive, thereby forming a stronger bond between the sidewall 10 and the upright frame elements. One preferred adhesive is Betamate 73312/73313, a two-part adhesive, available from Essex Specialty Product of Auburn Hills, Mich.

In one manufacturing approach, following the application of the adhesive, the front flange 28 of the sidewall skin 10 is attached to the rear upright frame element 60 of the door frame, such as by using fasteners (such as rivets or bolts)

extending through the flange and door frame. The rear edge 18 of the sidewall skin 10 is then pulled (in a direction towards the back of the cab or away from the door) to apply tension to the skin as it is positioned on the frame. For example, thirty to forty ft.-lbs. tension is applied to the skin. The tensioned sidewall skin is pressed or pulled against the adhesive on the exterior surfaces of the frame elements 72, 78 in order to secure the sidewall skin to the underlying frame assembly 70. More specifically, tension is applied along the sidewall skin in a front to rear direction to position it against the underlying frame. The skin thus adheres to the elements 72, 78 with the top edge 12 of the sidewall skin being positioned against the adhesive on the exterior surface of the upper reinforcing element 78. Clamps are preferably used to hold the skin against the adhesive. Although typically unnecessary, the top flange 26 of the sidewall skin may be mechanically fastened to the top surface 92 of the reinforcing element 78 by the use of fasteners or the like. Rather than totally eliminate such top edge fasteners, several spaced apart fasteners (e.g. 3 or 4), such as counter sunk screws, are preferably used along the top flange 26 along the transition region 32, a location of higher stresses, if the cab design includes such a region. It should, therefore, be appreciated that the sidewall is secured to the underlying frame assembly preferably without fasteners extending through the exterior side surfaces of the sidewall skin and into the frame elements. Thus, the surfaces of the sidewall skin, at least spaced from the edges of the sidewall, may be fastener free. It should be noted that during cab assembly, fasteners are commonly used along the bottom edges of the sidewall and at the rear of the truck.

The adhesive is then allowed to cure or is actively cured, for example by the application of heat. The edges of the sidewall skin are preferably clamped during the curing process to retain the sidewall in place. The clamps are removed after the curing process. Preferably, clamps are applied to the sidewall skin along the top edge of the frame and the sidewall is supported in a carrier during initial curing.

Once the sidewall skin 10 is adhesively (and mechanically, if some fasteners are used) secured to the sidewall frame assembly 70, the adhesive is most preferably actively cured. A single cure step may be used with the adhesive substantially totally cured during this step. For example, a fast curing adhesive may be used or a long cure time may be used under ambient conditions. Alternatively, heat may be applied to accelerate curing in a single curing step. However, a two-step heat curing process is preferred. In a first step, heat is applied to cure the adhesive sufficiently for handling purposes ("green" strength). The second step takes advantage of the fact that truck finishes, such as paint, are typically baked or heat cured. The second adhesive curing step is typically delayed until the paint baking step where it simultaneously is accomplished during paint curing. As a result, less additional energy is used to cure the adhesive. The curing process thus preferably comprises first and second heat curing steps. The first heat curing step again results in a partial curing of the adhesive, and the second curing step substantially completes the curing of the adhesive. The first heat curing step preferably occurs prior to the attachment of the sidewall structure to the other structures of the truck cab. The second curing step preferably occurs following the attachment of the sidewall structure to the remaining portions of the truck cab, such as after the truck cab is assembled. Most preferably, the second heat curing step preferably occurs simultaneously with a paint curing step after application of paint to the truck cab. The first or partial curing step gives the sidewall assembly "green" strength for handling during subsequent processing.

More specifically, during the first curing step, the sidewall assembly is pre-baked in order to partially cure the adhesive so that the assembly is sufficiently strengthened in order to be handled during the truck cab assembly process. Most specifically, the first curing step preferably involves heating the sidewall and frame to a temperature which is sufficiently high to accelerate initial adhesive curing to provide adequate sidewall handling strength within approximately one hour and sufficiently low so as to minimize thermal expansion mismatch between the frame and skin to thereby result in a substantially distortion-free exterior sidewall appearance when the sidewall is at or near ambient temperature. The first curing step produces a sidewall assembly (skin and frame) with structural handling strength without visible distortion of the skin exterior surface. By structural handling strength, it is meant that the sidewall assembly can be lifted, moved and installed on a chassis without the skin delaminating from the frame under typical manufacturing conditions. Preferably, although variable depending upon factors such as the type of adhesive being used, during the first curing step the sidewall assembly is heated at from about 120° F. to about 125° F. for a time of from about 75 minutes to about 80 minutes. In one specifically preferred approach, the initial cure step is accomplished by raising the temperature in an oven to 120° F. and holding the temperature at this magnitude for 75 minutes. During the second curing step, or paint curing step, the sidewall assembly is baked or heated for a time and at a temperature to substantially complete the curing of the adhesive for long-term (e.g. for the expected life of the truck) sidewall assembly durability. As a specific example, this second heat cure step may be a multiple stage process. For example, the sidewall (and cab assembly) may first be heated in an oven to 250° F. and held at this temperature for 15 minutes, then reduced to a temperature of 180° F. for 30 minutes, and then heated to 200° F. for 30 minutes.

The adhesive is preferably applied to the frame elements to eliminate "run out" (adhesive forming beads or running out beyond the edges of the frame elements) which could cause visible lines to be present at the exterior of the sidewall due to contraction or expansion of the sidewall during the final curing of the adhesive. Applying a single bead of adhesive to the center of the exterior surface of each frame element to be glued has proven effective. A robotic adhesive applicator, such as a three axis programmable applicator capable of moving along x, y and z axes (work envelope: x axis—75 inches, y axis—64 inches, z axis—10 inches) from Hi-Star, Inc. of Waterford, Mich. may be used to scuff the exterior frame element surfaces and to accurately apply the adhesive to the frame elements so as to eliminate undesirable "runout".

It should further be appreciated that the sidewall frame assembly can be formed and configured in alternative ways. For instance, the frame support may have horizontal supports in lieu of or in addition to vertical supports to which the sidewall skin is adhered.

Having illustrated and described the principles of the invention in preferred embodiments, it should be apparent to those skilled in the art that the embodiment can be modified in arrangement and detail without departing from such principles. This description illustrates certain embodiments of the present invention and should not be construed to limit the scope of the invention in any way. Other modifications and variations may be made without departing from the invention as defined by the appended claims and their equivalents.

What is claimed is:

1. A method of making a truck exterior sidewall comprising the acts of:

forming a sidewall skin having major opposed interior and exterior surfaces, the major interior surface facing toward the interior of the truck and the exterior major surface facing toward the exterior of the truck when the truck exterior sidewall is assembled into the truck;

forming a sidewall frame including plural frame elements having interior and exterior surfaces, the exterior surfaces facing toward the exterior of the truck when the truck exterior sidewall is assembled into the truck;

applying adhesive to the exterior surfaces of the frame elements;

positioning the sidewall skin onto the adhesive containing exterior surfaces of the frame elements;

at least partially curing the adhesive to adhere the sidewall skin to the frame elements;

wherein the sidewall skin has front, rear and top and bottom edge portions, the method further includes the acts of providing a door frame and fastening the front edge portion of the sidewall skin to the door frame; and wherein the positioning act comprises applying tension to the sidewall skin in a front to rear direction after it is fastened to the door frame.

2. A method according to claim 1 wherein the forming of a sidewall skin step includes the act of forming an inwardly directed flange along a major portion of the front edge portion of the sidewall skin, and wherein the fastening the front edge portion act comprises the act of fastening the flange to the door frame.

3. A method according to claim 1 wherein the sidewall forming act includes the act of forming an inwardly stepped transition region between the front and rear edge portions of the skin, the act of forming a sidewall frame includes the act of forming a sidewall frame with an upper reinforcing element interconnecting upper ends of upright frame elements, the upper reinforcing element having an exterior surface, wherein the applying adhesive act includes the act of applying adhesive to the exterior surface of the upper reinforcing element, and wherein the positioning the sidewall step also includes the step of positioning the top edge portion of the sidewall skin on the exterior surface of the upper reinforcing element.

4. A method according to claim 3 including the act of mechanically fastening the top edge portion of the sidewall skin to the upper reinforcing element near the transition region and wherein the sidewall has no other mechanical fasteners other than through the top edge portion and front flange prior to assembly onto a truck cab.

5. A method according to claim 1 wherein the curing act comprises the act of hearing the sidewall and frame to a temperature which is sufficiently high to accelerate initial curing of the adhesive to provide a sidewall and frame assembly with structural strength for handling during manufacture within anout one hour and at a temperature which is sufficiently low so as to minimize thermal expansion mismatch between the frame and skin during initial curing to thereby provide a sidewall and frame assembly which is substantially free of visual distortions at the exterior of the skin.

6. A method according to claim 5 in which the curing act comprises a first heating act according to claim 5 and a second heating act subsequent to the first heating act which substantially completes the curing of the adhesive to provide a sidewall frame assembly of long term durability.

7. A method according to claim 1 wherein the curing act comprises the act of heating the sidewall and frame to at least partially cure the adhesive.

8. A method according to claim 7 wherein the curing act comprises first and second heat curing acts, the first heat curing act resulting in a partial curing of the adhesive, and the second curing act substantially completing the curing of the adhesive.

9. A method according to claim 8 wherein the first curing act occurs prior to assembly of the sidewall onto a truck cab assembly and the second heat curing act occurs following the assembly of the sidewall onto a truck cab assembly.

10. A method according to claim 8 wherein the second heat curing act occurs simultaneously with a paint curing act during which paint applied to the truck cab is also cured.

11. A method of making a truck exterior sidewall comprising the acts of:

forming a sidewall skin of aluminum having major opposed interior and exterior surfaces, the major interior surface facing toward the interior of the truck and the exterior major surface facing toward the exterior of the truck when the truck exterior sidewall is assembled into the truck;

forming a sidewall frame including plural frame elements having interior and exterior surfaces, the exterior surfaces facing toward the exterior of the truck when the truck exterior sidewall is assembled into the truck;

applying adhesive to the exterior surfaces of the frame elements;

positioning the sidewall skin onto the adhesive containing exterior surfaces of the frame elements;

at least partially curing the adhesive to adhere the sidewall skin to the frame elements; and wherein the applying adhesive act comprises the act of applying adhesive without the adhesive reaching other than the exterior surfaces of the frame elements.

12. A method of making a truck sidewall comprising the acts of:

forming a sidewall skin having major opposed interior and exterior surfaces, and front, rear, top and bottom edge portions;

forming an inwardly directed flange along a major portion of the front edge portion of the sidewall skin;

forming an inwardly stepped transition region between the front and rear edge portions of the skin;

forming a sidewall frame including plural upright frame elements having interior and exterior surfaces and upper ends;

forming an upper reinforcing frame element interconnecting the upper ends of the upright frame elements, the upper reinforcing element having an exterior surface;

fastening the front flange to a door frame;

applying adhesive to the exterior surfaces of the upright frame elements and upper reinforcing element;

positioning the sidewall skin onto the exterior surfaces of the upright frame elements and the open edge of the skin on the exterior surface of the upper reinforcing frame element; and at least partially curing the adhesive to adhere the sidewall skin to the frame elements.

13. A method according to claim 12 wherein the curing act comprises the act of heating the sidewall and frame to at least partially cure the adhesive.

14. A method according to claim 11 wherein the curing act comprises first and second heat curing acts, the first heat curing act resulting in a partial curing of the adhesive, and the second curing act substantially completing the curing of the adhesive.

15. A method according to claim 14 wherein the first heat curing act occurs prior to assembly of the sidewall onto a truck cab assembly, and the second heat curing act occurs following the assembly of the sidewall onto a truck cab assembly.

16. A method according to claim 12 wherein the act of forming a sidewall skin includes the act of forming a rear corner spaced forwardly from the rear edge portion, and includes the act of forming an inwardly projecting flange along a major portion of the top edge portion of the sidewall skin, and wherein the positioning act includes mechanically fastening the top flange to the upper reinforcing element.

17. A method of making a truck sidewall comprising:

positioning a sidewall skin on a skin receiving surface of a sidewall frame with adhesive between the skin receiving surface and sidewall skin;

partially heat curing the adhesive during a first curing act; and completing the curing of the adhesive during a second heat curing act, wherein the second heat curing act is subsequent to assembly of the sidewall onto a truck cab and the first heat curing act is prior to assembly of the sidewall onto a truck cab, and wherein the second heat curing act occurs simultaneously with a cab paint curing act.

18. A method according to claim 1 wherein the applying adhesive act comprises the act of applying the adhesive without the adhesive reaching other than the exterior surfaces of the frame elements.

* * * * *